US012063465B2

(12) United States Patent
Fujino

(10) Patent No.: US 12,063,465 B2
(45) Date of Patent: Aug. 13, 2024

(54) NECK-WORN DEVICE

(71) Applicants: FAIRY DEVICES Inc., Tokyo (JP); DAIKIN INDUSTRIES, LTD., Osaka (JP)

(72) Inventor: Masato Fujino, Tokyo (JP)

(73) Assignees: FAIRY DEVICES INC., Tokyo (JP); DAIKIN INDUSTRIES, LTD., Osaka (JP)

( * ) Notice: Subject to any disclaimer, the term of this patent is extended or adjusted under 35 U.S.C. 154(b) by 217 days.

(21) Appl. No.: 17/776,396

(22) PCT Filed: Nov. 13, 2020

(86) PCT No.: PCT/JP2020/042370

§ 371 (c)(1),
(2) Date: Aug. 8, 2022

(87) PCT Pub. No.: WO2021/095832

PCT Pub. Date: May 20, 2021

(65) Prior Publication Data

US 2022/0400325 A1 Dec. 15, 2022

(30) Foreign Application Priority Data

Nov. 15, 2019 (JP) ................................ 2019-207493

(51) Int. Cl.
*H04R 1/02* (2006.01)
*H04R 5/027* (2006.01)

(52) U.S. Cl.
CPC ............. *H04R 1/028* (2013.01); *H04R 5/027* (2013.01)

(58) Field of Classification Search
CPC ....... H04R 1/1091; H04R 5/02; H04R 5/0335
See application file for complete search history.

(56) References Cited

U.S. PATENT DOCUMENTS 10,531,186 B1 * 1/2020 Litovsky ................ H04R 1/347
2016/0105982 A1 4/2016 Fujii
(Continued)

FOREIGN PATENT DOCUMENTS

JP 2013-143591 7/2013
JP 2016-81565 5/2016
(Continued)

OTHER PUBLICATIONS

International Search Report issued in International Patent Application No. PCT/JP2020/042370, dated Jan. 12, 2021, along with an English translation thereof.
(Continued)

*Primary Examiner* — Kile O Blair
(74) *Attorney, Agent, or Firm* — GREENBLUM & BERNSTEIN, P.L.C.

(57) ABSTRACT

[Problem] To provide a neck-worn device in which a battery or other electronic component is disposed at an appropriate location.
[Solution] This neck-worn device is to be worn at the neckline of a wearer, wherein a body part 30 comprises: a battery 90; a circuit board 85 on which is installed an electronic component that is driven by receiving power supplied from the battery 90; and a body part casing 32 in which the battery 90 and the circuit board 85 are stored. The circuit board 85 is disposed inside the body part casing 32 so as to be positioned in between the battery 90 and the neckline of the wearer while the device is being worn.
[Effect] Heat generated from the battery 90 is not readily transmitted to the wearer, thus improving the fit of the neck-worn device.

6 Claims, 6 Drawing Sheets

(56) References Cited

U.S. PATENT DOCUMENTS

| | | | |
|---|---|---|---|
| 2016/0205453 | A1 | 7/2016 | Wiese et al. |
| 2017/0280239 | A1 | 9/2017 | Sekiya et al. |
| 2018/0063620 | A1 | 3/2018 | Kim et al. |
| 2018/0070154 | A1 | 3/2018 | Watanabe |
| 2018/0152213 | A1 | 5/2018 | Lee et al. |
| 2019/0107993 | A1 | 4/2019 | Shibuya et al. |
| 2019/0187950 | A1 | 6/2019 | Takemura |
| 2020/0322518 | A1 | 10/2020 | Nagata |

FOREIGN PATENT DOCUMENTS

| | | |
|---|---|---|
| JP | 2017-108235 | 6/2017 |
| JP | 2018-38505 | 3/2018 |
| JP | 2018-121256 | 8/2018 |
| JP | 2019-16970 | 1/2019 |
| JP | 2019-110524 | 7/2019 |
| JP | 2019-134441 | 8/2019 |
| WO | 2017/175432 | 10/2017 |
| WO | 2017/212958 | 12/2017 |
| WO | 2018/205356 | 11/2018 |

OTHER PUBLICATIONS

Extended European Search Report issued in EP Application No. 20887184.8, dated Nov. 22, 2023.

* cited by examiner

NECK-WORN DEVICE

TECHNICAL FIELD

The present invention relates to a neck-mounted device to be worn around the neck of a user.

BACKGROUND ART

In recent years, wearable devices that can be worn on any part of the user's body to sense the state of the user and the state of the surrounding environment have been attracting attention. Various forms of wearable devices are known, such as those that can be worn on the user's arm, eyes, ears, neck, or clothing worn by the user. The user information collected by such a wearable device is analyzed, so that it is possible to acquire information useful for the wearer and other persons.

Further, as one type of wearable device, a device is known that can be worn around the neck of a user to record a voice emitted from the wearer or an interlocutor (PTL 1). PTL 1 discloses a voice processing system including a wearing portion worn by a user, and the wearing portion has at least three voice acquisition units (microphones) for acquiring voice data for beamforming. Further, the system described in PTL 1 includes an image capture unit configured to capture an image of the front while being worn by the user. Further, PTL 1 has also proposed that the image recognition result of the captured image captured by the image capture unit is used to identify the presence and position of another speaker and estimate the orientation of the user's face so as to control the direction of the directivity of each voice acquisition unit according to the orientation and position.

CITATION LIST

Patent Literature

[PTL 1] Japanese Patent Application Publication No. 2019-134441

SUMMARY OF INVENTION

Technical Problems

Incidentally, in the design of wearable devices, it is preferable to increase the capacity of the battery as much as possible in order to secure a long time for continuous wearing, but there are restrictions on the size and shape of the battery from the viewpoint of downsizing and wearability of the device. In this regard, in the system described in PTL 1, since the wearing unit itself may have a curved shape, it is desirable that the battery is also a curved battery, which has a curved shape.

In addition, since a storage battery with a large capacity such as a lithium-ion battery generates a considerable amount of heat, it is necessary to pay attention to the place where the battery is to be placed in the wearable device that comes into contact with the human body. In particular, since a neck-mounted wearable device is worn around the neck, which is sensitive to temperature changes, for the case where a large-capacity battery is installed, inefficient exhaust of the heat generated by the battery causes discomfort to the wearer, so that there is a concern that it will be difficult to continue wearing the device for a long period of time.

Further, for the case where a curved battery is mounted on a curved unit as in the system described in PTL 1, it is required to manufacture a battery having a special shape suitable for the shape of that unit, so that it is not possible to use batteries with a general-purpose shape, which are generally distributed. In this case, since the cost of the battery becomes high, there is also a problem that the selling price of the system becomes high.

Therefore, a main object of the present invention is to provide a neck-mounted device in which electronic components such as a battery are arranged in proper places.

Solution to Problems

As a result of diligent studies on means for achieving the above object, the inventor of the present invention has obtained the knowledge that interposing a circuit board on which electronic components are mounted between a battery of a neck-mounted device and the neck of a wearer basically makes it difficult for the heat generated by the battery to be transmitted to the wearer. Then, the inventor conceived that the above-mentioned object would be achieved based on this knowledge, and has made the present invention. Describing it in detail, the present invention has the following configuration.

The present invention relates to a neck-mounted device to be worn around the neck of a user. A neck-mounted device according to the present invention includes a battery, a circuit board (printed circuit board) on which electronic components driven by electronic power supplied from the battery are mounted, and a housing in which the battery and the circuit board are housed. Further, the circuit board is disposed in the housing so as to be located between the battery and the neck of a wearer during wearing. Note that the electronic components mounted on the circuit board may include one, more, or all of a control device, a storage device, a communication device, and a sensor device.

With the above configuration, disposing the circuit board between the neck of the wearer and the battery makes it difficult for the heat generated by the battery to be transmitted to the wearer, so that it is easy to use the neck-mounted device for a long time. In addition, even in the unlikely event of an abnormal situation such as thermal runaway of the battery, the circuit board can serve as a barrier to protect the neck of the wearer, so that it is possible to improve the safety of the neck-mounted device.

In the neck-mounted device according to the present invention, the housing includes a first arm portion and a second arm portion to be placed at positions across the neck of the wearer; and a main body portion which connects the first arm portion and the second arm portion are connected at positions corresponding to a back of the neck of the wearer. Further, this main body portion houses control system circuits. The control system circuits herein include a battery, electronic components driven by electric power supplied from this battery, and a circuit board on which these electronic components are mounted. The main body portion is configured to include a hanging portion extending downward from the first arm portion and the second arm portion. This hanging portion has a space for housing the control system circuits. Note that, as described above, in the hanging portion of the main body portion, the circuit board is disposed so as to be located between the battery and the neck of the wearer during wearing. Note that, in the present invention, the battery and the circuit board need only be housed in the main body portion, and it is not required that the battery and all of them are housed in the space formed by the hanging portion of the main body portion. A control system circuit other than the battery and the circuit board may also be housed in the hanging portion.

With the above configuration, the hanging portion being provided in the main body portion makes it possible to secure a sufficient space for housing control system circuits, which include the battery, the electronic components, and the circuit board. As a result, such control system circuits can be mounted to be gathered together in the main body portion. Further, by disposing the main body portion, which has become heavier due to the gathering of the control system circuits, on the back of the neck of the wearer, the stability during wearing is improved. Furthermore, by disposing the heavy main body portion at the position of the back of the neck near the trunk of the wearer, the load on the wearer due to the weight of the entire device can be reduced.

In the neck-mounted device according to the present invention, it is preferable that the main body portion is flat. Note that the flat main body portion need only have a flatness enough to accommodate a flat (non-curved) battery and a circuit board, and the "flatness" as used herein may refer to a gentle curved surface according to the shape of the back of the neck of the wearer. In this way, a relatively flat main body portion being provided between the first arm portion and the second arm portion makes it possible to include a general-purpose flat battery, which is generally distributed, as a power source for the neck-mounted device. This eliminates the need to use a battery with a special shape such as a curved battery, so that the manufacturing cost of the device can be reduced.

It is preferable that the neck-mounted device according to the present invention further includes a proximity sensor at a position corresponding to the back of the neck of the wearer. In this way, the proximity sensor being provided at a position corresponding to the back of the neck of the wearer makes it possible to efficiently determine whether or not the neck-mounted device is worn. For example, when the proximity of an object is detected by the proximity sensor, the power of the neck-mounted device or the electronic components mounted on the neck-mounted device may be turned on.

It is preferable that the neck-mounted device according to the present invention further includes one or more sound collection units provided at one or more locations (preferably two or more locations) on each of the first arm portion and the second arm portion. In this way, the sound collection units being provided on the first arm portion and the second arm portion, respectively, make it possible to effectively collect the voice emitted from the wearer.

It is preferable that the neck-mounted device according to the present invention further includes a sound emission unit at a position corresponding to the back of the neck of the wearer. Note that the sound emission unit may be a general speaker that transmits sound waves (air vibration) to the wearer via air, or a bone conduction speaker that transmits sound to the wearer by bone vibration. Further, the sound output from the sound emission unit may be emitted in a substantially horizontal direction toward the rear of the wearer, or may be emitted in a substantially vertical upward direction (or downward direction). Assuming that the sound emission unit is a general speaker, the sound emission unit being provided at a position corresponding to the back of the neck of the wearer makes it difficult for the sound output from this sound emission unit to reach an interlocutor who exists in front of the wearer. This makes it possible to prevent the interlocutor from confusing the voice emitted from the wearer with the sound emitted from the sound emission unit of the neck-mounted device. Further, in the form in which the sound collection unit(s) are provided on the first arm portion and/or the second arm portion of the neck-mounted device, the sound emission unit being provided at a position corresponding to the back of the neck of the wearer makes it possible to set the physical distance between the sound emission unit and the sound collection unit(s) at a maximum. Specifically, when sound is output from a sound emission unit while a sound collection unit is collecting the voice of the wearer or the interlocutor, the sound from the sound emission unit may be mixed with the voice of the wearer or the like to be recorded. For the case where the sound from the sound emission unit is mixed with the sound of the wearer or the like in this way, it is difficult to completely remove it by echo cancellation process or the like. Therefore, in order to prevent the sound of the wearer or the like from being mixed with the sound from the sound emission unit as much as possible, it is preferable to provide the sound emission unit at a position corresponding to the back of the neck of the wearer as described above to keep a physical distance from the sound collection unit.

Further, it is preferable that the sound emission unit is installed not at a position corresponding to the center at the rear of the neck of the wearer but at a position off-centered to a left or right. In this way, by disposing the sound emission unit at a position that is not approximately in the center of the main body portion 30 but is off-centered to the left or right, the wearer can hear an output sound clearly with either the left or right ear even when the volume of the output sound is reduced. In addition, when the volume of the output sound is reduced, it becomes difficult for the output sound to reach the interlocutor, so that the interlocutor can avoid confusing the wearer's voice with the output sound of the sound emission unit.

It is preferable that the neck-mounted device according to the present invention further includes both or one of an image capture unit provided on the first arm portion and a non-contact type of sensor unit provided on the second arm portion. The image capture unit being mounted on the first arm portion makes it possible to effectively shoot the view in front of the wearer. Further, the non-contact type of sensor unit being mounted on the second arm portion makes it easy to operate on/off of, for example, the image capture unit or other electronic components.

Advantageous Effects of Invention

According to the present invention, it is possible to provide a neck-mounted device in which electronic components such as a battery are arranged in proper places.

DESCRIPTION OF EMBODIMENTS

An embodiment of the present invention will be described below with reference to the drawings. The present invention is not limited to the embodiment described below, and includes any modifications of the following embodiment as appropriate in the scope obvious to those skilled in the art.

Figure 1:
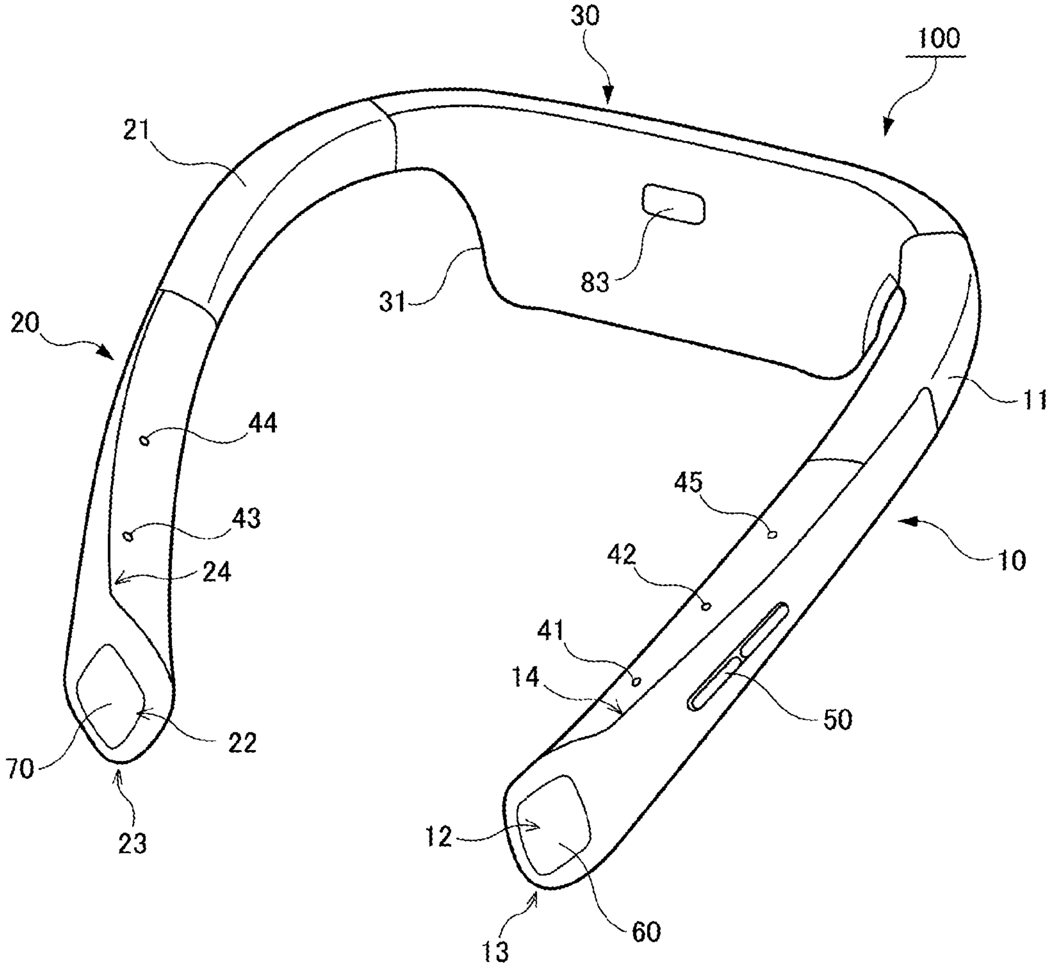
FIG. 1 is a perspective view illustrating an embodiment of a neck-mounted device.
Figure 2:
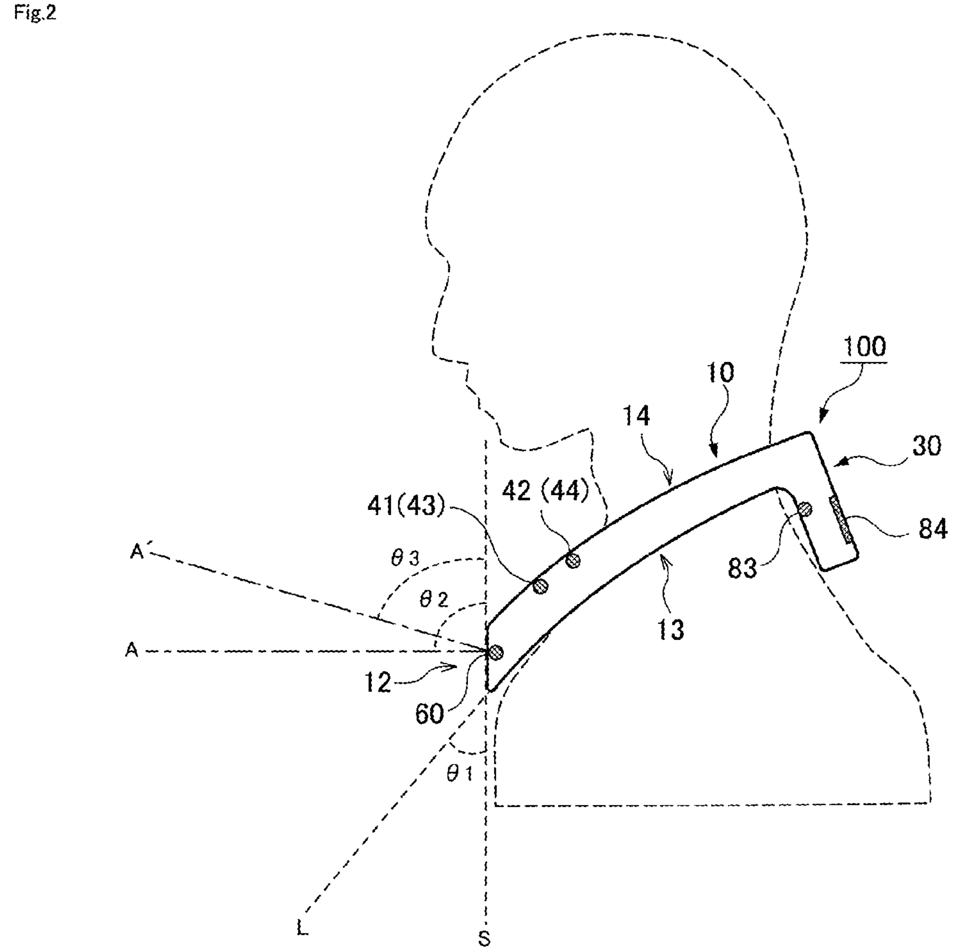
FIG. 2 is a side view schematically illustrating a state in which the neck-mounted device is worn.

FIG. 1 illustrates an embodiment of a neck-mounted device 100 according to the present invention. Further, FIG. 2 illustrates a state in which the neck-mounted device 100 is worn. As illustrated in FIG. 1, a housing which forms the neck-mounted device 100 includes a left arm portion 10, a right arm portion 20, and a main body portion 30. The left arm portion 10 and the right arm portion 20 extend forward from the left end and the right end of the main body portion 30, respectively, and the neck-mounted device 100 has a structure in which the device as a whole forms a substantially U shape when viewed in a plan view. When the neck-mounted device 100 is worn, as illustrated in FIG. 2, the entire device is mounted around the neck of a wearer in a way that the main body portion 30 is brought into contact with the back of the neck of the wearer, and the left arm portion 10 and the right arm portion 20 are hung from the sides of the wearer's neck to the chest side. Various electronic components are housed in the housing of the neck-mounted device 100.

A plurality of sound collection units (microphones) 41 to 45 are provided on the left arm portion 10 and the right arm portion 20. The sound collection units 41 to 45 are arranged mainly for the purpose of acquiring voices of the wearer and an interlocutor. As illustrated in FIG. 1, it is preferable that the first sound collection unit 41 and the second sound collection unit 42 are provided in the left arm portion 10, and the third sound collection unit 43 and the fourth sound collection unit 44 are provided in the right arm portion 20. Further, as an optional element, one or more sound collection units may be additionally provided in the left arm portion 10 and the right arm portion 20. In the example illustrated in FIG. 1, the left arm portion 10 is provided with the fifth sound collection unit 45 in addition to the first sound collection unit 41 and the second sound collection unit 42. Sound signals acquired by these sound collection units 41 to 45 are transmitted to a control unit 80 (see FIG. 5) provided in the main body portion 30 to perform a predetermined analysis process. Note that, as will be described later, the main body portion 30 houses control system circuits such as electronic circuits including such a control unit 80 and a battery.

The sound collection units 41 to 45 are provided on the front sides of the left arm portion 10 and the right arm portion 20 (on the chest side of the wearer). Specifically, assuming that the neck-mounted device 100 is worn around the neck of a general adult male (with a neck circumference of 35 to 37 cm), it is preferable that at least the first sound collection unit 41 to the fourth sound collection unit 44 are designed to be located in front of the wearer's neck (on the chest side). The neck-mounted device 100 is intended to collect the voices of the wearer and the interlocutor at the same time, and the sound collection units 41 to 44 being arranged on the front side of the wearer's neck make it possible to appropriately acquire not only the voice of the wearer but also the voice of the interlocutor. Further, when the sound collection units 41 to 44 are arranged on the front side of the wearer's neck, the voice of a person standing on the back side of the wearer is blocked by the wearer's body, which makes it difficult for the voice to directly reach the sound collection units 41 to 44. It is expected that the person standing on the back side of the wearer is not the person who is interacting with the wearer. Therefore, the physical arrangement of the sound collection units 41 to 44, which blocks the voice of such a person, can suppress such noise.

Further, the first sound collection unit 41 to the fourth sound collection unit 44 are arranged on the left arm portion 10 and the right arm portion 20 so as to be symmetrical. Specifically, a quadrilateral shape which is linearly symmetric is formed by a line segment connecting the first sound collection unit 41 and the second sound collection unit 42, a line segment connecting the third sound collection unit 43 and the fourth sound collection unit 44, a line segment connecting the first sound collection unit 41 and the third sound collection unit 43, and a line segment connecting the second sound collection unit 42 and the fourth sound collection unit 44. More specifically, in the present embodiment, a trapezoidal shape is formed with a short side being the line segment connecting the first sound collection unit 41 and the third sound collection unit 43. However, the quadrilateral is not limited to the trapezoidal shape, and the sound collection units 41 to 44 may be arranged so as to form a rectangle or a square.

The left arm portion 10 is further provided with an image capture unit 60. Specifically, the image capture unit 60 is provided on a tip surface 12 of the left arm portion 10, so that the image capture unit 60 can capture a still image or a moving image on the front side of the wearer. The image acquired by the image capture unit 60 is transmitted to the control unit 80 in the main body portion 30 and stored as image data. Further, the image acquired by the image capture unit 60 may be transmitted to a server device via the Internet. Further, as will be described in detail later, a process (beamforming process) may also be performed in which the position of the mouth of the interlocutor is identified from the image acquired by the image capture unit 60 and the voice emitted from the mouth is emphasized.

The right arm portion 20 is further provided with a non-contact type of sensor unit 70. The sensor unit 70 is disposed on a tip surface 22 of the right arm portion 20 mainly for the purpose of detecting the movement of the wearer's hand on the front side of the neck-mounted device 100. The detection information from the sensor unit 70 is used mainly for controlling the image capture unit 60, such as activating the image capture unit 60 and starting and stopping shooting. For example, the sensor unit 70 may be configured to control the image capture unit 60 in response to detecting that an object such as the wearer's hand is close to the sensor unit 70, or may be configured to control the image capture unit 60 in response to detecting that the wearer has performed a predetermined gesture within the detection range of the sensor unit 70. Note that, in the present embodiment, the image capture unit 60 is disposed on the tip surface 12 of the left arm portion 10, and the sensor unit 70 is disposed on the tip surface 22 of the right arm portion 20, but the positions of the image capture unit 60 and the sensor unit 70 may be reversed.

Further, the detection information from the sensor unit 70 may be used to activate the image capture unit 60, the sound collection units 41 to 45, and/or the control unit 80 (main CPU). For example, in the state where the sensor unit 70, the sound collection units 41 to 45, and the control unit 80 are constantly activated and the image capture unit 60 is stopped, when the sensor unit 70 detects a specific gesture, the image capture unit 60 may be activated (Condition 1). Note that, under this Condition 1, the image capture unit 60 may be activated when any of the sound collection units 41 to 45 detects a specific voice. Alternatively, in the state where the sensor unit 70 and the sound collection units 41 to 45 are constantly activated and the control unit 80 and the image capture unit 60 are stopped, when the sensor unit 70 detects a specific gesture, any one of the control unit 80 and the image capture unit 60 may be activated (Condition 2). Even under this Condition 2, the control unit 80 and the image capture unit 60 may be activated when any of the sound collection units 41 to 45 detects a specific voice. Alternatively, in the state where only the sensor unit 70 is constantly activated and the sound collection units 41 to 45, the control unit 80, and the image capture unit 60 are stopped, when the sensor unit 70 detects a specific gesture, any one of the sound collection units 41 to 45, the control unit 80, and the image capture unit 60 may be activated (Condition 3). It can be said that for Conditions 1 to 3, the effect of reducing power consumption is greater in the order of Condition 3>Condition 2>Condition 1.

As illustrated in the side view of FIG. 2, in the present embodiment, the housing of the neck-mounted device 100 is designed for the tip surface 12 of the left arm portion 10 (and the tip surface 22 of the right arm portion 20) to be vertical during wearing as ideal. Specifically, the neck-mounted device 100 is worn so that the left arm portion 10 and the right arm portion 20 hang slightly from the back of the neck toward the vicinity in front of the clavicle of the chest, and as a result, the tip surfaces 12 and 22 of the left arm portion 10 and the right arm portion 20 are located around the front of the clavicle. At this time, it is preferable that the tip surfaces 12 and 22 are substantially parallel (within ±10 degrees) to the vertical direction.

Further, in order to make the tip surfaces 12 and 22 run vertically as described above, the tip surfaces 12 and 22 of the arm portions 10 and 20 are surfaces inclined with respect to lower edges 13 and 23, respectively. In FIG. 2, the angle (inclination angle of the tip surfaces) formed by the tip surfaces 12 and 22 and the lower edges 13 and 23 is indicated by reference character Oi. Note that, in FIG. 2, a straight line S indicates a straight line parallel to the tip surfaces 12 and 22, and reference character L indicates an extension line of the lower edges 13 and 23 of the arm portions 10 and 20. Here, the inclination angle $\theta_1$ of the tip surfaces 12 and 22 is an acute angle, for example, preferably 40 to 85 degrees, and particularly preferably 50 to 80 degrees or 60 to 80 degrees. Such an inclination of the tip surfaces 12 and 22 with respect to the lower edges 13 and 23 of the arm portions 10 and 20 makes it easy for the tip surfaces 12 and 22 to be vertical during wearing. Thus, the image capture unit 60 and the sensor unit 70 provided on the tip surfaces 12 and 22 can efficiently shoot or detect an area on the front side of the wearer.

Further, in FIG. 2, a straight line A indicates the optical axis of the image capture unit 60. The optical axis (main axis) is an axis of symmetry passing through the center of the lens of the image capture unit 60. As illustrated in FIG. 2, assuming that the tip surface 12 of the left arm portion 10 is vertical during wearing, the optical axis A of the image capture unit 60 is preferably substantially horizontal (±10 degrees). In this way, the optical axis A of the image capture unit 60 is substantially horizontal in the wearing state of the neck-mounted device 100, so that the line of sight when the wearer is facing the front is substantially parallel to the optical axis A of the image capture unit 60. Therefore, the image captured by the image capture unit 60 is close to the scenery actually viewed by the wearer. More specifically, in FIG. 2, the angle formed by the tip surface 12 of the left arm portion and the optical axis A of the image capture unit 60 is indicated by reference character $\theta_2$. The inclination angle $\theta_2$ of the optical axis A is preferably 75 to 115 degrees or 80 to 100 degrees, and particularly preferably 85 to 95 degrees or 90 degrees.

Further, in FIG. 2, a straight line A' indicates another example of the optical axis of the image capture unit 60. As illustrated in FIG. 2, assuming that the tip surface 12 of the left arm portion 10 is vertical during wearing, the optical axis A' of the image capture unit 60 is preferably inclined upward with respect to the horizontal (corresponding to the straight line A in FIG. 2). As described above, the tip surfaces 12 and 22 of the arm portions 10 and 20 are located near the front of the clavicle of the wearer during wearing, and however, the upward optical axis A' of the image capture unit 60 makes it easy to shoot the interlocutor's face and mouth. In addition, inclining the optical axis A' of the image capture unit upward with respect to the horizontal in advance makes it possible to shoot an upper space in the vertical direction without forcing the wearer to take an unnatural posture. More specifically, in FIG. 2, the angle (inclination angle of the optical axis) formed by the tip surface 12 of the left arm portion and the optical axis A' of the image capture unit 60 is indicated by reference character $\theta_3$. The inclination angle $\theta_3$ of the optical axis A' is preferably 30 to 85 degrees, and particularly preferably 40 to 80 degrees or 50 to 80 degrees so that it runs upward during wearing.

Further, as illustrated in FIG. 2, in the arm portions 10 and 20, the extension lines of the lower edges 13 and 23 and upper edges 14 and 24 are all downward and point toward the ground. Thus, the interlocutor facing the wearer is less likely to receive the impression that the interlocutor's face is being shot by the image capture unit 60 provided on the tip surface 12 of the left arm portion 10. As described above, even when the face and mouth of the interlocutor are shot by the image capture unit 60, it is less likely to cause discomfort to the interlocutor. On the other hand, as described above, in the present embodiment, the tip surface 12 of the left arm portion 10 is designed for the tip surface 12 of the left arm portion 10 to run substantially vertically during wearing and for the optical axis of the image capture unit 60 disposed on this tip surface 12 to run upward. Thus, although the interlocutor is less likely to receive the impression that the interlocutor's face is being shot, the image capture unit 60 can actually effectively shoot the face and mouth of the interlocutor.

Figure 3:
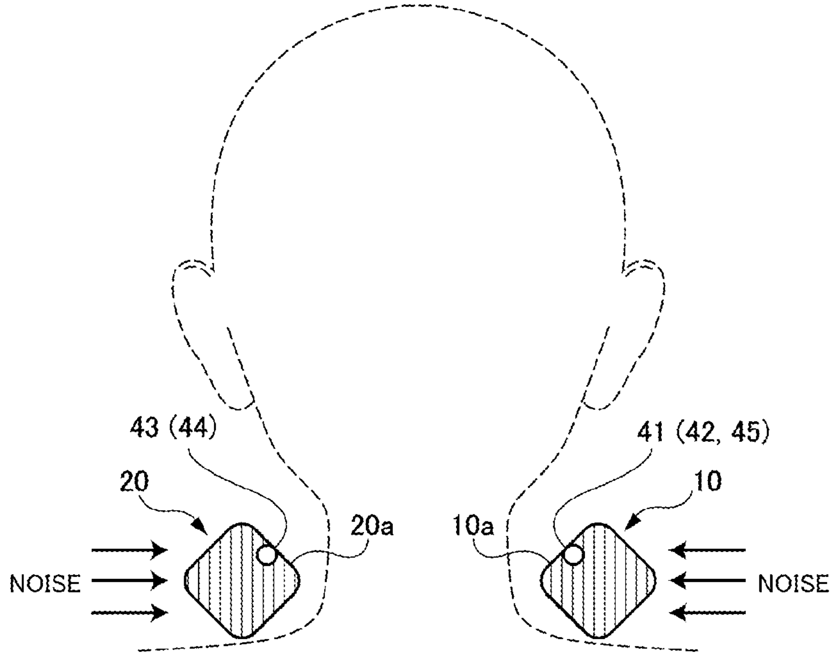
FIG. 3 is a cross-sectional view schematically illustrating a position where a sound collection unit is provided.

FIG. 3 schematically illustrates the cross-sectional shapes of the left arm portion 10 and the right arm portion 20 at the portions where the sound collection units 41 to 45 are provided. As illustrated in FIG. 3, in a preferred embodiment, the left arm portion 10 and the right arm portion 20 have a substantially rhombic cross-sectional shape at the portions where the sound collection units 41 to 45 are provided. The left arm portion 10 and the right arm portion 20 have inclined surfaces **10*a* and 20*a* facing the wearer's head (more specifically, the wearer's mouth), respectively. In other words, the perpendicular line perpendicular to each of the inclined surfaces 10*a* and 20*a* directs to the wearer's head. The sound collection units 41 to 45 are provided on the inclined surfaces 10*a* and 20*a* of the left arm portion 10 and the right arm portion 20. Such an arrangement of the sound collection units 41 to 45 on the inclined surfaces 10*a* and 20*a* makes it easy for the voice emitted from the wearer's mouth to reach the sound collection units 41 to 45 linearly. Further, as illustrated in FIG. 3, for example, wind noise generated around the wearer is less likely to directly enter the sound collection units 41 to 45, so that such noise can be physically suppressed. Note that, in the example illustrated in FIG. 3, although the cross-sectional shape of the left arm portion 10 and the right arm portion 20 is a rhombic shape, the cross-sectional shape is not limited to this and may be a shape having the inclined surfaces 10***a* and 20*a* facing the wearer's head, such as a triangular shape, a pentagonal shape, or another polygonal shape.

The left arm portion 10 and the right arm portion described above are connected by the main body portion 30 provided at a position where the back of the wearer's neck comes into contact with. This main body portion 30 houses a control system circuit(s). The control system circuits include a battery, a plurality of electronic components driven by electric power supplied from this battery, and a circuit board on which these electronic components are mounted. Further, the electronic components may include one, more, or all of a control device (processor or the like), a storage device, a communication device, and a sensor device. As illustrated in FIG. 1, the housing which forms the main body portion 30 has a substantially flat shape, and can house a flat (plate-shaped) circuit board and a battery.

Further, the main body portion 30 has a hanging portion 31 extending downward from the left arm portion 10 and the right arm portion 20. The hanging portion 31 has a space for housing the control system circuits. In this way, the hanging portion 31 being provided in the main body portion 30 secures a space for housing the control system circuits. Further, the control system circuits are gathered together in the main body portion 30 having the hanging portion 31. Therefore, based on the total weight 100% of the neck-mounted device 100, the weight of the main body portion 30 occupies 40 to 80% or 50% to 70%. By disposing such a heavy main body portion 30 on the back of the wearer's neck, the stability during wearing is improved. Further, by disposing the heavy main body portion 30 at the position near the trunk of the wearer, the load on the wearer due to the weight of the entire device can be reduced.

Figure 4:
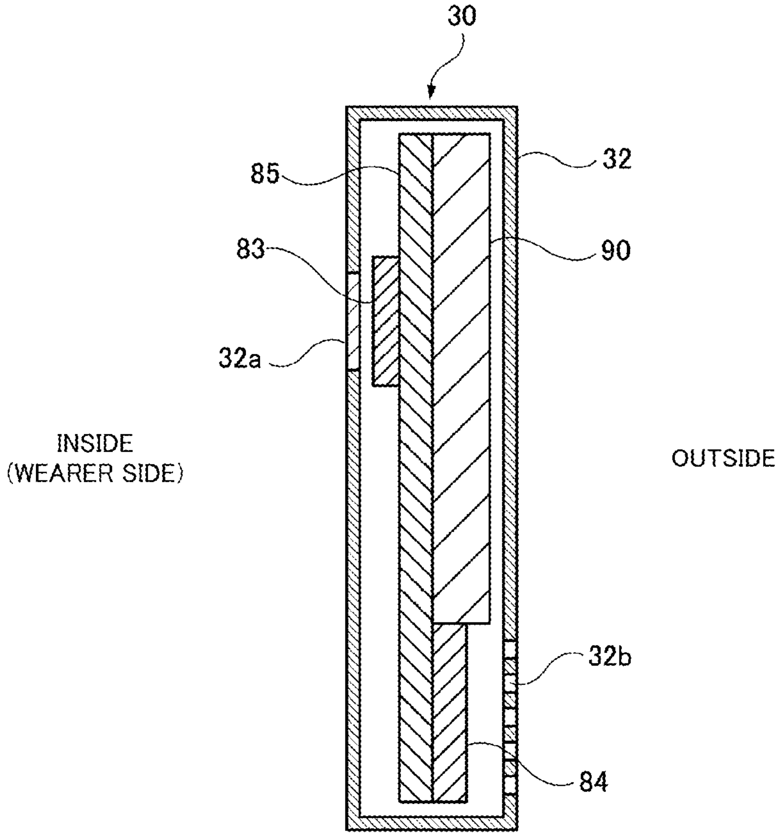
FIG. 4 is a cross-sectional view schematically illustrating a positional relationship between the battery, a circuit board, and various electronic components, which are housed in the main body portion.

FIG. 4 is a vertical cross-sectional view of the main body portion 30, and schematically illustrates a positional relationship between the control system circuits housed in the main body portion 30. The left side in FIG. 4 is the inside of the neck-mounted device 100 that comes into contact with the wearer's neck, and the right side in FIG. 4 is the outside of the neck-mounted device 100 that does not come into direct contact with the wearer's neck. As illustrated in FIG. 4, at least a flat circuit board 85 and a flat battery 90 are housed in the housing (main body housing 32) which forms the main body portion 30. On the circuit board 85, various electronic components driven by electric power supplied from the battery 90 are mounted. Examples of the electronic components mounted on the circuit board 85 include a proximity sensor 83 and a sound emission unit 34 (speaker), which are illustrated in FIG. 4. In addition, a control device such as a CPU, a storage device such as a memory or a storage device, a communication device, and various sensor devices may be electrically connected to the circuit board 85.

As illustrated in FIG. 4, in the present embodiment, the battery 90 is disposed outside the circuit board 85. In other words, in the wearing state of the neck-mounted device 100, the circuit board 85 is interposed between the back of the wearer's neck and the battery 90. The circuit board 85 (printed circuit board) is formed with the surface layer of a substrate made from an insulator such as resin, glass, or Teflon (registered trademark) and with conductive wires inside the surface layer, and various electronic components mounted on the insulating substrate are electrically connected to each other by the wires. The circuit board 85 may be any of an inflexible rigid substrate, a flexible substrate, or a composite thereof. Further, the circuit board 85 may be any of a single-sided board having a wiring pattern formed on only one side, a double-sided board having a wiring pattern formed on both sides, or a multilayer board in which a plurality of insulating board layers are laminated and electrically connected to each other. For the circuit board 85, other known configurations can be adopted. The battery 90 composed of a lithium-ion battery or the like generates heat not a little, but disposing the circuit board 85 between the back of the wearer's neck and the battery 90 makes it difficult for the heat generated from the battery 90 to transmit to the wearer, and thus it is expected that the wearing feeling of the neck-mounted device 100 will be improved.

Further, the proximity sensor 83 is provided inside the main body portion 30 (on the wearer side). The proximity sensor 83 may be mounted on the inner surface of the circuit board 85, for example. The proximity sensor 83 is for detecting the approach of an object, and when the neck-mounted device 100 is worn around the wearer's neck, the proximity sensor 83 detects the approach of the neck. Accordingly, when the proximity sensor 83 is in a state of detecting the proximity of an object, devices such as the sound collection units 41 to 45, the image capture unit 60, and the sensor unit 70 may be turned on (activated state); when the proximity sensor 83 is in a state of not detecting the proximity of an object, these devices may be turned off (sleep state) or may not be activated. As a result, the power consumption of the battery 90 can be efficiently suppressed. Further, when the proximity sensor 83 is in a state of not detecting the proximity of an object, the image capture unit 60 and the sound collection units 41 to 45 may be prohibited to be activated. Therefore, it can also be expected to have the effect of preventing data from being recorded intentionally or unintentionally during not wearing. In addition, a known proximity sensor 90 may be used, but for an optical type as used, in order to transmit the detection light of the proximity sensor 90, a transmissive portion 32*a* for transmitting the detection light may be provided in the main body housing 32.

Further, the sound emission unit 84 (speaker) is provided on the outside of the main body portion 30 (opposite side of the wearer). The sound emission unit 84 may be mounted on the outer surface of the circuit board 85, for example. As illustrated in FIG. 4, in the present embodiment, the sound emission unit 84 is disposed so as to output sound toward the outside of the main body portion 30. Specifically, a grill 32*b* (holes) is formed on the outer surface of the main body housing 32, and the sound (sound wave) output from the sound emission unit 84 through the grill 32*b* is emitted to the outside of the main body housing 32. This emission of sound from the back of the wearer's neck to directly behind the wearer makes it difficult for the sound output from the sound emission unit 84 to directly reach the interlocutor present in front of the wearer. This makes it possible to prevent the interlocutor from confusing the voice emitted from the wearer with the sound emitted from the sound emission unit of the neck-mounted device. Further, in the present embodiment in which the sound collection units 41 to 45 are provided in the left arm portion 10 and the right arm portion 20, the sound emission unit 84 being provided at a position corresponding to the back of the wearer's neck makes it possible to set the physical distance between the sound emission unit 84 and the sound collection units 41 to 45 at a maximum. Specifically, when some sound is output from the sound emission unit 84 while the sound collection units 41 to 45 are collecting the voice of the wearer or the interlocutor, the sound (self-output sound) from the sound emission unit 84 may be mixed with the voice of the wearer or the like to be recorded. If the self-output sound is mixed with the voice to be recorded, it interferes with voice recognition. Therefore, it is necessary to remove this self-output sound by echo cancellation process or the like. However, in reality, due to the influence of the vibration of the housing and the like, it is difficult to completely remove the self-output sound even if the echo cancellation process is performed. Therefore, in order to minimize the volume of the self-output sound to be mixed with the voice of the wearer or the like, it is preferable to provide the sound emission unit 84 at a position corresponding to the back of the neck of the wearer as described above to keep a physical distance from the sound collection unit. In addition, a configuration may be adopted in which the grill 32*b* is provided on the inner surface of the main body housing 32 and the sound emission unit 84 is provided inside the circuit board 85 to emit sound toward the inside of the main body portion 30. However, in this case, the sound emitted from the sound emission unit 84 is blocked by the wearer's neck, which may result in indistinct sound as heard.

Further, it is preferable that the sound emission unit 84 is installed not at a position corresponding to the center at the rear of the wearer's neck but at a position off-centered to the left or right. The reason is that the sound emission unit 84 is closer to either the left or right ear as compared with the case where the sound emission unit 84 is located in the center of the back of the neck. In this way, by disposing the sound emission unit 84 at a position that is not approximately in the center of the main body portion 30 but is off-centered to the left or right, the wearer can hear an output sound clearly with either the left or right ear even when the volume of the output sound is reduced. In addition, when the volume of the output sound is reduced, it becomes difficult for the output sound to reach the interlocutor, so that the interlocutor can avoid confusing the wearer's voice with the output sound of the sound emission unit 84.

Note that the grill 32*b* not only allows the sound output from the sound emission unit 84 to pass through, but also functions to exhaust the heat generated from the battery 90 to the atmosphere. The grill 32*b* being formed on the outer surface of the main body housing 32 makes it difficult for the heat discharged through the grill 32*b* to directly reach the wearer, so that the heat can be efficiently exhausted without causing the wearer to be uncomfortable.

Further, as a structural feature of the neck-mounted device 100, the left arm portion 10 and the right arm portion 20 have flexible portions 11 and 21 in the vicinity of the connecting portion with the main body portion 30. The flexible portions 11 and 21 are made of a flexible material such as rubber or silicone. Thus, when the neck-mounted device 100 is worn, the left arm portion 10 and the right arm portion 20 are likely to fit on the wearer's neck and shoulders. In addition, wires for connecting the sound collection units 41 to 45 and an operation unit 50 to the control unit 80 are also inserted in the flexible portions 11 and 21.

Figure 5:
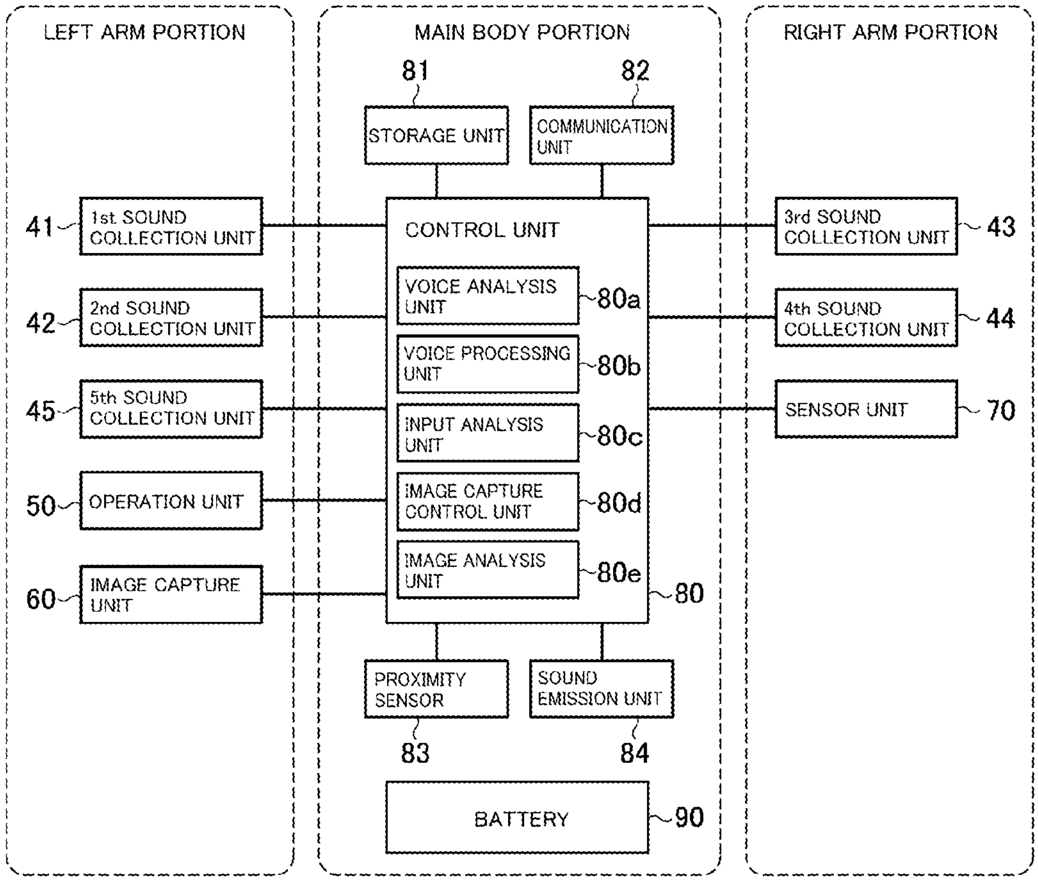
FIG. 5 is a block diagram illustrating a functional configuration example of the neck-mounted device.

FIG. 5 is a block diagram illustrating a functional configuration of the neck-mounted device 100. As illustrated in FIG. 5, the neck-mounted device 100 includes the first sound collection unit 41 to the fifth sound collection unit 45, the operation unit 50, the image capture unit 60, the sensor unit 70, the control unit 80, a storage unit 81, a communication unit 82, the proximity sensor 83, the sound emission unit 84, and the battery 90. The first sound collection unit 41, the second sound collection unit 42, the fifth sound collection unit 45, the operation unit 50, and the image capture unit 60 are arranged in the left arm portion 10, the third sound collection unit 43, the fourth sound collection unit 44, and the sensor unit 70 are arranged in the right arm portion 20, and the control unit 80, the storage unit 81, the communication unit 82, the proximity sensor 83, the sound emission unit 84, and the battery 90 are arranged in the main body portion 30. In addition to the functional configuration illustrated in FIG. 5, the neck-mounted device 100 may include module devices included in a general portable information terminal as appropriate, such as sensors including a gyro sensor, an acceleration sensor, a geomagnetic sensor, and a GPS sensor.

As the sound collection units 41 to 45, known microphones such as a dynamic microphone, a condenser microphone, and a MEMS (Micro-Electrical-Mechanical Systems) microphone may be adopted. Each of the sound collection units 41 to 45 converts sound into an electric signal, amplifies the electric signal by an amplifier circuit, converts the resulting signal into digital information by an A/D conversion circuit, and outputs the information to the control unit 80. One object of the neck-mounted device 100 according to the present invention is to acquire not only the voice of the wearer but also the voice of one or more interlocutors existing around the wearer. Therefore, it is preferable to adopt omnidirectional (non-directional) microphones as the sound collection units 41 to 45 so that the sound generated around the wearer can be widely collected.

The operation unit 50 receives an operation input from the wearer. As the operation unit 50, a known switch circuit, touch panel, or the like can be adopted. The operation unit 50 receives, for example, an operation to instruct the start or stop of voice input, an operation to instruct power on/off of the device, an operation to instruct volume up/down of the speaker, and other necessary operations to implement the functions of the neck-mounted device 100. The information input via the operation unit 50 is transmitted to the control unit 80.

The image capture unit 60 acquires image data of a still image or a moving image. A general digital camera may be adopted as the image capture unit 60. The image capture unit 60 is composed of, for example, a shooting lens, a mechanical shutter, a shutter driver, a photoelectric conversion element such as a CCD image sensor unit, a digital signal processor (DSP) that reads an amount of electric charge from the photoelectric conversion element and generates image data, and an IC memory. Further, the image capture unit 60 preferably includes an autofocus sensor (AF sensor) that measures the distance from the shooting lens to the subject, and a mechanism for adjusting the focal distance of the shooting lens according to the distance detected by the AF sensor. The type of AF sensor is not particularly limited, but a known passive type such as a phase difference sensor or a contrast sensor may be used. Further, as the AF sensor, an active type sensor that emits infrared rays or ultrasonic waves to the subject and receives the reflected light or the reflected waves may be used. The image data acquired by the image capture unit 60 is supplied to the control unit 80 and stored in the storage unit 81 to perform a predetermined image analysis process, or is transmitted to a server device via the Internet through the communication unit 82.

Further, the image capture unit 60 preferably includes a so-called wide-angle lens. Specifically, the vertical angle of view of the image capture unit 60 is preferably 100 to 180 degrees, and particularly preferably 110 to 160 degrees or 120 to 150 degrees. Such a wide angle set as the vertical angle of view of the image capture unit 60 makes it possible to shoot a wide area of at least the chest from the head of the interlocutor, and in some cases, to shoot the whole body of the interlocutor. The horizontal angle of view of the image capture unit 60 is not particularly limited, but a wide angle of view of about 100 to 160 degrees is preferably adopted.

Further, since the image capture unit 60 generally consumes a large amount of power, it is preferable that the image capture unit 60 is activated only when necessary and is in a sleep state in other cases. Specifically, the activation of the image capture unit 60 and the start or stop of shooting are controlled based on the detection information from the sensor unit 70 or the proximity sensor 83, and when a certain time elapses after the shooting is stopped, the image capture unit 60 may enter the sleep state again.

The sensor unit 70 is a non-contact type of detection device for detecting the movement of an object such as wearer's fingers. An example of the sensor unit 70 is a proximity sensor or a gesture sensor. The proximity sensor detects, for example, that the wearer's fingers are close to a predetermined range. As the proximity sensor, a known type of sensor such as an optical, ultrasonic, magnetic, capacitive, or thermosensitive sensor may be adopted. The gesture sensor detects, for example, the movement and shape of the wearer's fingers. An example of a gesture sensor is an optical sensor, which irradiates an object with light from an infrared light emitting LED and captures the change in the reflected light with a light receiving element to detect the movement or shape of the object. In the present invention, it is particularly preferable to adopt a non-contact type of gesture sensor as the sensor unit 70. The detection information from the sensor unit 70 is transmitted to the control unit 80 and is mainly used for controlling the image capture unit 60. Further, it is also possible to control the sound collection units 41 to 45 based on the detection information from the sensor unit 70. Since the sensor unit 70 generally consumes less power, the sensor unit 70 is always preferably activated while the power of the neck-mounted device 100 is turned on. Further, the sensor unit 70 may be activated when the proximity sensor 83 detects that the neck-mounted device 100 is worn.

Further, it is preferable that the shooting range of the image capture unit 60 and the detection range of the sensor unit 70 are both on the front side of the wearer, and these shooting and detection ranges at least partially overlap. In particular, it is preferable that the shooting range of the image capture unit 60 and the detection range of the sensor unit 70 overlap directly in front of the wearer (for example, in front of the chest, between the left arm and the right arm). Such an overlap of the shooting range and the detection range on the front side of the wearer makes it possible for the wearer to intuitively perform operations on the shooting unit 60 through the sensor unit 70. Further, for example, when the wearer performs a gesture indicating the shooting range with a finger (a gesture called a "finger frame"), the shape of the finger frame can be identified by the sensor unit 70 (gesture sensor). In this case, the image capture unit 60 is controlled so as to shoot the range of the finger frame, and the shape of the finger frame is identified by performing image analysis or the like on an image captured by the image capture unit, so that it is possible to improve the accuracy of control of the image capture unit 60 based on the gesture of the finger frame. In this way, by adopting a structural feature that allows the imaging range of the shooting unit 60 and the detection range of the sensor 70 to overlap, various functions can be implemented in the neck-mounted device by using improved software.

The control unit 80 performs a computation process for controlling other elements included in the neck-mounted device 100. As the control unit 80, a processor such as a CPU may be used. The control unit 80 basically reads a program stored in the storage unit 81 and executes a predetermined computation process according to this program. The control unit 80 can also write and read the results of computation according to the program to and from the storage unit 81 as appropriate. As will be described in detail later, the control unit 80 includes a voice analysis unit 80*a*, a voice processing unit 80*b*, an input analysis unit 80*c*, an image capture control unit 80*d*, and an image analysis unit 80*e* to mainly perform a process of controlling the image capture unit 60 and a beamforming process. These elements 80*a* to 80*e* are basically implemented as functions on software. However, these elements may be implemented as a hardware circuit(s).

The storage unit 81 is an element for storing information used for the computation process and the like in the control unit 80 and the results of computation. Specifically, the storage unit 81 stores a program that causes a general-purpose portable information communication terminal to function as a voice input device according to the present invention. When this program is started according to an instruction from the user, the control unit 80 executes a process according to the program. The storage function of the storage unit 81 can be realized by a nonvolatile memory such as an HDD and an SDD. Further, the storage unit 81 may have a function as a memory for writing or reading, for example, the progress of the computation process of the control unit 80. The memory function of the storage unit 81 can be realized by a volatile memory such as a RAM or a DRAM. Further, the storage unit 81 may store ID information unique to the user who possesses it. The storage unit 81 may also store an IP address which is identification information of the neck-mounted device 100 on a network.

In addition, the storage unit 81 may store a trained model used in the beamforming process by the control unit 80. The trained model is an inference model obtained by performing machine learning such as deep learning and reinforcement learning in a server device on the cloud, for example. Specifically, in the beamforming process, sound data acquired by the plurality of sound collection units is analyzed to identify the position or direction of the sound source that generated the sound. In this case, for example, the trained model has been created in advance in a way that a large number of data sets (teacher data) of the position information of the sound source in the server device and the data acquired from the sound generated from the sound source by the plurality of sound collection units are accumulated, and machine learning is performed using the teacher data. Then, when sound data is acquired by the plurality of sound collection units in the individual neck-mounted device 100, the position or direction of the sound source can be efficiently identified by referring to this trained model. In addition, the neck-mounted device 100 may update this trained model at any time by communicating with the server device.

The communication unit 82 is an element for wireless communication with a server device on the cloud or another neck-mounted device. As the communication unit 82, a communication module for wireless communication according to a known mobile communication standard such as 3G (W-CDMA), 4G (LTE/LTE-Advanced), and 5G and/or by a wireless LAN method such as Wi-Fi (registered trademark) may be adopted in order to communicate with a server device or another neck-mounted device via the Internet. In addition, as the communication unit 82, a communication module for proximity wireless communication such as Bluetooth (registered trademark) or NFC may be adopted in order to directly communicate with another neck-mounted device.

The proximity sensor 83 is mainly used for detecting the proximity of the neck-mounted device 100 (particularly the main body portion 30) and the wearer. As the proximity sensor 83, a known type of sensor such as an optical, ultrasonic, magnetic, capacitive, or thermosensitive sensor as described above may be adopted. The proximity sensor 83 is disposed inside the main body portion 30 and detects that the wearer's neck is close to a predetermined range. When the proximity sensor 83 detects the proximity of the wearer's neck, the sound collection units 41 to 45, the image capture unit 60, the sensor unit 70, and/or the sound emission unit 84 can be activated.

The sound emission unit 84 is an acoustic device that converts an electric signal into physical vibration (that is, sound). An example of the sound emission unit 84 is a general speaker that transmits sound to the wearer by air vibration. In this case, as described above, a preferable configuration is that the sound emission unit 84 is provided on the outside of the main body portion 30 (the side opposite to the wearer) to emit sound in the direction away from the back of the wearer's neck (horizontally rearward) or the direction along the back of the neck (vertically upward or vertically downward). Further, the sound emission unit 84 may be a bone conduction speaker that transmits sound to the wearer by vibrating the wearer's bones. In this case, a configuration may be provided in which the sound emission unit 84 is provided inside the main body portion 30 (on the wearer side) so that the bone conduction speaker comes into contact with the bone (cervical spine) on the back of the wearer's neck.

The battery 90 is a battery that supplies electric power to the various electronic components included in the neck-mounted device 100. As the battery 90, a rechargeable storage battery is used. As the battery 90, a known battery may be adopted such as a lithium ion battery, a lithium polymer battery, an alkaline storage battery, a nickel cadmium battery, a nickel hydrogen battery, or a lead storage battery. As described above, the battery 90 is disposed in the main body housing 32 so that the circuit board 85 interposed between the battery 90 and the back of the wearer's neck.

Subsequently, the beamforming process will be specifically described with reference to FIG. 6. When the user mounts the neck-mounted device 100 according to the embodiment illustrated in FIG. 1, at least the four sound collection units 41 to 44 are located around the wearer's neck on the chest side as illustrated in (a) and (b) of FIG. 6. Note that since the fifth sound collection unit 45 is an auxiliary sound collection unit and is not an essential element, the description thereof is omitted here. In the present embodiment, the first sound collection unit 41 to the fourth sound collection unit 44 are all omnidirectional microphones, and always mainly collect the voice emitted from the wearer's mouth and collect other environmental sounds around the wearer. Note that, in order to reduce power consumption, the sound collection units 41 to 44 and the control unit 80 may be normally stopped, and when a specific gesture or the like is detected by the sensor unit 70, these sound collection units 41 to 44 and the control unit 80 may be activated. The environmental sounds include the voices of interlocutors located around the wearer. When the wearer and/or the interlocutor emits voices, voice data is acquired by the sound collection units 41 to 44. The sound collection units 41 to 44 output their respective voice data to the control unit 80.

The voice analysis unit 80*a* of the control unit 80 performs a process of analyzing the voice data acquired by the sound collection units 41 to 44. Specifically, the voice analysis unit 80*a* identifies the spatial position or direction of the sound source from which the voice is emitted, based on the voice data from the sound collection units 41 to 44. For example, when a trained model for machine learning is installed in the neck-mounted device 100, the voice analysis unit 80*a* can identify the position or direction of the sound source by using the voice data from the sound collection units 41 to 44 by referring to the trained model. Alternatively, since the distances between the sound collection units 41 are known, the voice analysis unit 80*a* may calculate distances from the sound collection units 41 to 44 to the sound source based on the time differences when the voice reaches the sound collection units 41 to 44 and identify the spatial position or direction of the sound source by a triangular survey by using the distances.

Further, the voice analysis unit 80*a* determines whether or not the position or direction of the sound source identified by the above process matches a position or direction presumed to be the mouth of the wearer or the mouth of the interlocutor. For example, since the positional relationship between the neck-mounted device 100 and the wearer's mouth and the positional relationship between the neck-mounted device 100 and the mouth of the interlocutor can be assumed in advance, when the sound source is located within the assumed range, it may be determined that the sound source is the mouth of the wearer or the interlocutor. Further, when the sound source is located significantly below, above, or behind the neck-mounted device 100, it can be determined that the sound source is not the mouth of the wearer or the interlocutor.

Next, the voice processing unit 80*b* of the control unit 80 performs a process of emphasizing or suppressing a sound component included in the voice data based on the position or direction of the sound source identified by the voice analysis unit 80*a*. Specifically, if the position or direction of the sound source matches the position or direction presumed to be the mouth of the wearer or the interlocutor, the sound component emitted from the sound source is emphasized. On the other hand, if the position or direction of the sound source does not match the mouth of the wearer or the interlocutor, the sound component emitted from the sound source may be regarded as noise and the sound component may be suppressed. As described above, in the present invention, the beamforming process is performed in which omnidirectional sound data is acquired by using the plurality of omnidirectional microphones and a specific sound component is emphasized or suppressed by voice processing on the software of the control unit 80. This makes it possible to acquire the voice of the wearer and the voice of the interlocutor at the same time, and emphasize the sound components of the voices as needed.

Figure 6:
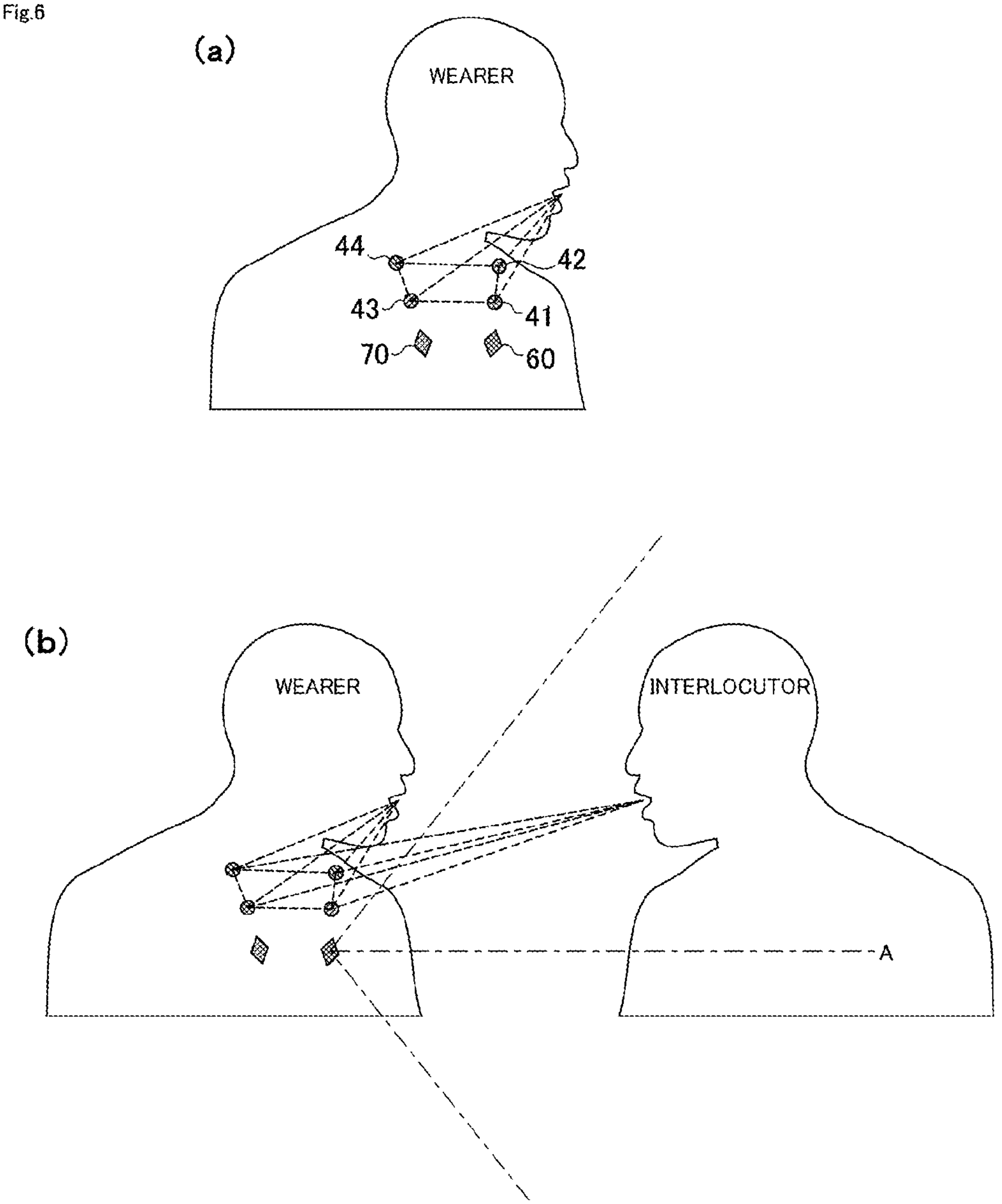
FIG. 6 schematically illustrates a beamforming process for acquiring the voices of a wearer and an interlocutor.

Further, as illustrated in (b) of FIG. 6, for the case where the voice of the interlocutor is acquired, it is preferable to activate the image capture unit 60 to shoot the interlocutor. Specifically, the wearer performs a predetermined gesture with a finger(s) of the wearer within the detection range of the non-contact type of sensor unit 70. The gesture includes performing a predetermined movement with finger(s) and forming a predetermined shape with finger(s). When the sensor unit 70 detects the movement of the finger(s), the input analysis unit 80*c* of the control unit 80 analyzes the detection information from the sensor unit 70 to determine whether or not the gesture of the wearer's finger(s) matches a preset gesture. For example, predetermined gestures related to the control of the image capture unit 60 are preset such as a gesture for activating the image capture unit 60, a gesture for starting shooting with the image capture unit 60, and a gesture for stopping the shooting, and the input analysis unit 80*c* determines whether or not the wearer's gesture matches any one of the above-mentioned predetermined gestures based on the detection information from the sensor unit 70.

Next, the image capture control unit 80*d* of the control unit 80 controls the image capture unit 60 based on the result of analysis by the input analysis unit 80*c*. For example, when the input analysis unit 80*c* determines that the wearer's gesture matches the gesture for activating the image capture unit 60, the image capture control unit 80*d* activates the image capture unit 60. If the input analysis unit 80*c* determines that the wearer's gesture matches the gesture for starting shooting after the image capture unit 60 is activated, the image capture control unit 80*d* controls the image capture unit 60 to start shooting an image. Further, if the input analysis unit 80*c* determines that the wearer's gesture matches the gesture for stopping the shooting after the shooting is started, the image capture control unit 80*d* controls the image capture unit 60 to stop the shooting of an image. In addition, the image capture control unit 80*d* may put the image capture unit 60 into the sleep state again when a certain period of time has elapsed after the shooting is stopped.

The image analysis unit 80*e* of the control unit 80 analyzes the image data of the still image or the moving image acquired by the image capture unit 60. For example, the image analysis unit 80*e* can identify the distance from the neck-mounted device 100 to the mouth of the interlocutor and the positional relationship between the two by analyzing the image data. Further, the image analysis unit 80*e* can analyze whether or not the interlocutor's mouth is open or whether or not the interlocutor's mouth is open and closed based on the image data, so that it is also possible to identify whether or not the interlocutor is speaking. The result of analysis by the image analysis unit 80*e* is used for the above-mentioned beamforming process. Specifically, by using the result of analysis of the image data by the image capture unit 60 in addition to the results of analysis of the voice data collected by the sound collection units 41 to 44, the accuracy of the process of identifying the spatial position and direction of the interlocutor's mouth can be improved. In addition, by analyzing the movement of the interlocutor's mouth included in the image data and identifying that the interlocutor is speaking, the accuracy of the process of emphasizing the voice emitted from the interlocutor's mouth can be improved.

The voice data processed by the voice processing unit 80*b* and the image data acquired by the image capture unit 60 are stored in the storage unit 81. Further, the control unit 80 can also transmit the processed voice data and the image data to a server device on the cloud or another neck-mounted device 100 through the communication unit 82. The server device can also perform a speech-to-text conversion process, a translation process, statistical processing, and any other language processing based on the voice data received from the neck-mounted device 100. In addition, the image data acquired by the image capture unit 60 can be used to improve the accuracy of the language processing. Further, the server device can improve the accuracy of the trained model by using the voice data and the image data received from the neck-mounted device 100 as teacher data for machine learning. Further, a remote call may be made between the wearers by transmitting and receiving voice data between the neck-mounted devices 100. In this case, voice data may be directly transmitted and received between the neck-mounted devices 100 through proximity wireless communication, or voice data may be transmitted and received between the neck-mounted devices 100 via the Internet through the server device.

In the specification of the present application, an embodiment has been described in which the neck-mounted device 100 mainly includes the voice analysis unit 80*a*, the voice processing unit 80*b*, and the image analysis unit 80*e*, which serve as functional components, to perform the beamforming process locally. However, one, some, or all of the functions of the voice analysis unit 80*a*, the voice processing unit 80*b*, and the image analysis unit 80*e* can be shared by a server device on the cloud connected to the neck-mounted device 100 via the Internet. In this case, for example, the neck-mounted device 100 may transmit the voice data acquired by the sound collection units 41 to 45 to the server device, and the server device may identify the position or direction of the sound source or emphasize the voice of the wearer or the interlocutor and suppress other noise to perform voice processing. Further, the image data acquired by the image capture unit 60 may be transmitted from the neck-mounted device 100 to the server device, and the server device may perform a process of analyzing the image data. In this case, a voice processing system is constructed of the neck-mounted device 100 and the server device.

As described above, in the present specification, the embodiment of the present invention has been described with reference to the drawings in order to express the contents of the present invention. However, the present invention is not limited to the above-described embodiment, but includes modifications and improvements obvious to those skilled in the art based on the matters described in the present specification.

In addition, the shooting method to be performed by the image capture unit 60 may be controlled based on the detection information from the sensor unit 70. Specifically, examples of the shooting method of the image capture unit 60 include still image shooting, moving image shooting, slow motion shooting, panoramic shooting, time-lapse shooting, timer shooting, and the like. When the sensor unit 70 detects the movement of the finger(s), the input analysis unit 80*c* of the control unit 80 analyzes the detection information from the sensor unit 70 to determine whether or not the gesture of the wearer's finger(s) matches a preset gesture. For example, a unique gesture is set for each shooting method of the image capture unit 60, and the input analysis unit 80*c* determines whether or not the wearer's gesture matches a preset gesture based on the detection information from the sensor unit 70. The image capture control unit 80*d* controls the shooting method to be performed by the image capture unit 60 based on the result of analysis by the input analysis unit 80*c*. For example, when the input analysis unit 80*c* determines that the wearer's gesture matches a gesture for still image shooting, the image capture control unit 80*d* controls the image capture unit 60 to shoot a still image. Alternatively, when the input analysis unit 80*c* determines that the wearer's gesture matches a gesture for moving image shooting, the image capture control unit 80*d* controls the image capture unit 60 to shoot a moving image. In this way, it is possible to specify the shooting method by the image capture unit 60 according to the gesture of the wearer.

Further, in the above-described embodiment, although the image capture unit 60 is mainly controlled based on the detection information from the sensor unit 70, the sound collection units 41 to 45 are also controlled based on the detection information from the sensor unit 70. For example, a unique gesture related to the start or stop of sound collection by the sound collection units 41 to 45 is preset, and the input analysis unit 80*c* determines whether or not the wearer's gesture matches a preset gesture based on the detection information from the sensor unit 70. Then, when a gesture related to the start or stop of sound collection is detected, the sound collection units 41 to 45 may start or stop the sound collection according to the detection information of that gesture.

Further, in the above-described embodiment, although the image capture unit 60 is mainly controlled based on the detection information from the sensor unit 70, the image capture unit 60 may also be controlled based on the voice information input to the sound collection units 41 to 45. Specifically, the voice analysis unit 80*a* analyzes the voices acquired by the sound collection units 41 to 45. Specifically, voice recognition is performed on the voice of the wearer or the interlocutor, and it is determined whether or not that voice is related to the control of the image capture unit 60. After that, the image capture control unit 80*d* controls the image capture unit 60 based on the result of analysis of the voice. For example, when a predetermined voice related to the start of shooting is input to the sound collection units 41 to 45, the image capture control unit 80*d* activates the image capture unit 60 to start shooting. Further, when a predetermined voice for specifying a shooting method to be performed by the image capture unit 60 is input to the sound collection units 41 to 45, the image capture control unit 80*d* controls the image capture unit 60 to execute the specified shooting method. In addition, after the sound collection units 41 to 45 are activated based on the detection information from the sensor unit 70, the image capture unit 60 may also be controlled based on the voice information input to the sound collection units 41 to 45.

Furthermore, the content of a control command based on the input information from the sensor unit 70 may also be changed according to the image captured by the image capture unit 60. Specifically, first, the image analysis unit 80*e* analyzes the image acquired by the image capture unit 60. For example, based on feature points included in the image, the image analysis unit 80*a* identifies whether it is an image in which a person appears, whether it is an image in which a specific subject (artificial object, natural object, etc.) appears, or the situation (shooting location, shooting time, weather, etc.) when the image was captured. Note that the person included in the image may be classified by gender or age, or may be identified as an individual.

Next, patterns of control commands based on gestures by the human finger(s) are stored in the storage unit 81 according to the types of images (types of person, subject, and situation). At this time, even for the same gesture, different control commands may be assigned depending on the types of images. Specifically, even for the same gesture, when a person appears in the image, the control command is for focusing the face of the person, and when a characteristic natural object appears in the image, the control command is for panoramic shooting of the surroundings of the natural object. In addition, the gender and age of the person appearing in the image, whether the subject is an artificial or natural object, or the shooting location, time, weather, and the like of the image may be detected from the image, and the meaning of a gesture may be differentiated depending on the result of detection. Then, the input analysis unit 80*c* refers to the image analysis result by the image analysis unit 80*e*, identifies the meaning and content corresponding to the image analysis result for the gesture detected by the sensor unit 70, and generates a control command to be input to the neck-mounted device 100. In this way, by changing the meaning and content of the gesture according to the content of the image, it is possible to input various types of control commands to the device based on the gesture according to the shooting situation and purpose of the image.

REFERENCE SIGNS LIST

10 Left arm portion
11 Flexible portion
12 Tip surface
13 Lower surface
14 Upper surface
20 Right arm portion
21 Flexible portion
22 Tip surface
23 Lower surface
24 Upper surface
30 Main body portion
31 Hanging portion
32 Main body housing
32*a* Transmissive portion
32*b* Grill
41 First sound collection unit
42 Second sound collection unit
43 Third sound collection unit
44 Fourth sound collection unit
45 Fifth sound collection unit
50 Operation unit
60 Image capture unit
70 Sensor unit
80 Control unit
80*a* Voice analysis unit
80*b* Voice processing unit
80*c* Input analysis unit
80*d* Image capture control unit
80*e* Image analysis unit
81 Storage unit
82 Communication unit
83 Proximity sensor
84 Sound emission unit
85 Circuit board
90 Battery
100 Neck-mounted device

The invention claimed is:

1. A neck-mounted device to be worn around a neck of a wearer, the neck-mounted device comprising:
- a first arm portion and a second arm portion to be placed at positions across the neck; and
- a main body portion which connects the first arm portion and the second arm portion at positions corresponding to a back of the neck of the wearer and houses control system circuits, wherein
- the main body portion is configured to include a hanging portion extending downward from the first arm portion and the second arm portion and having a space for housing the control system circuits,
- the control system circuits include a battery and a circuit board on which electronic components driven by electric power supplied from the battery are mounted, and the circuit board is disposed in the housing so as to be located between the battery and the neck of the wearer during wearing.

2. The neck-mounted device according to claim 1, wherein the electronic components mounted on the circuit board include one or more of a control device, a storage device, a communication device, and a sensor device.

3. The neck-mounted device according to claim 1, further comprising a proximity sensor provided at a position corresponding to the back of the neck of the wearer.

4. The neck-mounted device according to claim 1, further comprising one or more sound collection units provided at one or more locations on each of the first arm portion and the second arm portion.

5. The neck-mounted device according to claim 1, further comprising a sound emission unit at a position corresponding to the back of the neck of the wearer, wherein the sound emission unit is installed not at a position corresponding to the center at the rear of the neck of the wearer but at a position off-centered to a left or right.

6. The neck-mounted device according to claim 1, further comprising both or one of an image capture unit provided on the first arm portion and a non-contact type of sensor unit provided on the second arm portion.

* * * * *